(12) United States Patent
Alemany Negrete et al.

(10) Patent No.: US 11,117,301 B2
(45) Date of Patent: Sep. 14, 2021

(54) MOULD FOR INJECTING THERMOPLASTICS AND METHOD FOR USING SAID MOULD

(71) Applicants: COMERCIAL NICEM EXINTE, S.A., Barcelona (ES); Luis Manuel Alemany Negrete, Madrid (ES)

(72) Inventors: Luis Manuel Alemany Negrete, Madrid (ES); Ferran Navarro I Teixidó, Barcelona (ES)

(73) Assignees: COMERCIAL NICEM EXINTE, S.A., Barcelona (ES); Luis Manuel Alemany Negrete, Madrid (ES)

( * ) Notice: Subject to any disclaimer, the term of this patent is extended or adjusted under 35 U.S.C. 154(b) by 263 days.

(21) Appl. No.: 15/760,031

(22) PCT Filed: Sep. 15, 2016

(86) PCT No.: PCT/ES2016/070646
§ 371 (c)(1),
(2) Date: Mar. 14, 2018

(87) PCT Pub. No.: WO2017/046435
PCT Pub. Date: Mar. 23, 2017

(65) Prior Publication Data
US 2019/0047198 A1 Feb. 14, 2019

(30) Foreign Application Priority Data

Sep. 15, 2015 (ES) .............................. ES201531310
Sep. 14, 2016 (ES) .............................. ES201631192

(51) Int. Cl.
*B29C 45/76* (2006.01)
*B29C 33/38* (2006.01)
(Continued)

(52) U.S. Cl.
CPC .............. *B29C 45/76* (2013.01); *B29C 33/38* (2013.01); *B29C 33/50* (2013.01); *B29C 45/045* (2013.01);
(Continued)

(58) Field of Classification Search
CPC ....... B29C 45/045; B29C 45/34; B29C 45/77; B29C 45/78; B29C 2945/76531;
(Continued)

(56) References Cited

U.S. PATENT DOCUMENTS 3,601,857 A 8/1971 Hampel
4,243,362 A 1/1981 Rees et al.
(Continued)

FOREIGN PATENT DOCUMENTS

DE 10328946 A1 1/2005
EP 2722146 A1 4/2014
(Continued)

OTHER PUBLICATIONS

English Language Translation of the Written Opinion of the International Search Report for PCT Application No. PCT/ES2016/070646; dated Oct. 27, 2016.
(Continued)

*Primary Examiner* — Jacob T Minskey
*Assistant Examiner* — Adrien J Bernard
(74) *Attorney, Agent, or Firm* — Thomas E. Lees, LLC

(57) ABSTRACT

Mould for producing plastic items obtained by the injection of thermoplastic material of the "hot melt" or polyamide type, the mould being made of flexible vulcanised silicone, rubber or other elastomers, the mould being formed by two parts which, when facing each other and attached, generate a series of compartments and channels that allow for the introduction of the melted thermoplastic material and the filling of the cavities with the shape of the item desired, and, (Continued)

in turn, allow for a vacuum to be generated, also removing the inside air from the mould by means of a series of conduits and channels; and a method or methodology for producing said plastic items by means of said mould, allowing for the reproduction of short and medium series of items produced with plastic materials, and in which a control system and a mould incorporating a means to be identified can be added to the method.

12 Claims, 5 Drawing Sheets

(51) Int. Cl.
| | | |
|---|---|---|
| B29C 33/50 | (2006.01) | |
| B29C 45/04 | (2006.01) | |
| B29C 45/17 | (2006.01) | |
| B29C 45/34 | (2006.01) | |
| B29C 45/77 | (2006.01) | |
| B29C 45/78 | (2006.01) | |
| B29K 77/00 | (2006.01) | |

(52) U.S. Cl.
CPC .......... *B29C 45/1756* (2013.01); *B29C 45/34* (2013.01); *B29C 45/77* (2013.01); *B29C 45/78* (2013.01); *B29C 2945/76531* (2013.01); *B29C 2945/76545* (2013.01); *B29C 2945/76551* (2013.01); *B29K 2077/00* (2013.01); *B29K 2883/00* (2013.01)

(58) Field of Classification Search
CPC ............ B29C 45/7613; B29C 45/7626; B29C 33/405; B29C 45/1744; B29C 2045/2683; B29K 2883/00
See application file for complete search history.

(56) References Cited

U.S. PATENT DOCUMENTS

| | | | | |
|---|---|---|---|---|
| 4,294,792 | A | | 10/1981 | Arons et al. |
| 4,307,057 | A | * | 12/1981 | Hettinga ............. B30B 15/0023 264/328.11 |
| 4,776,915 | A | | 10/1988 | Natori et al. |
| 5,639,416 | A | * | 6/1997 | Pennisi ................... B29C 45/37 264/571 |
| 5,798,129 | A | | 8/1998 | Megleo |
| 6,821,110 | B2 | | 11/2004 | Carlson et al. |
| 2004/0241049 | A1 | | 12/2004 | Carvalho |
| 2006/0246166 | A1 | * | 11/2006 | Hsu .......................... B29C 33/02 425/143 |
| 2010/0117262 | A1 | | 5/2010 | Gringer |
| 2013/0224327 | A1 | * | 8/2013 | Altonen ................. B29C 33/02 425/552 |
| 2015/0174803 | A1 | * | 6/2015 | Newman ................ B29C 45/14 264/40.1 |

FOREIGN PATENT DOCUMENTS

| | | |
|---|---|---|
| EP | 2731202 A1 | 5/2014 |
| FR | 2730662 A1 | 8/1996 |
| FR | 2993081 A1 | 1/2014 |
| WO | 2007034000 A1 | 3/2007 |
| WO | 2012117143 A1 | 9/2012 |
| WO | 2012127089 A1 | 9/2012 |

OTHER PUBLICATIONS

Igualador, A. Pérez; International Search Report for PCT Application No. PCT/ES2016/070646; Spanish Trademark and Patent Office; Madrid, Spain; Oct. 27, 2016.

Igualador, A. Pérez; Written Opinion of the International Search Report for PCT Application No. PCT/ES2016/070646; Spanish Trademark and Patent Office; Madrid, Spain; Oct. 27, 2016.

Igualador, A. Pérez; Search Report for Spanish Patent Application No. 201531310; dated Jan. 22, 2016.

\* cited by examiner

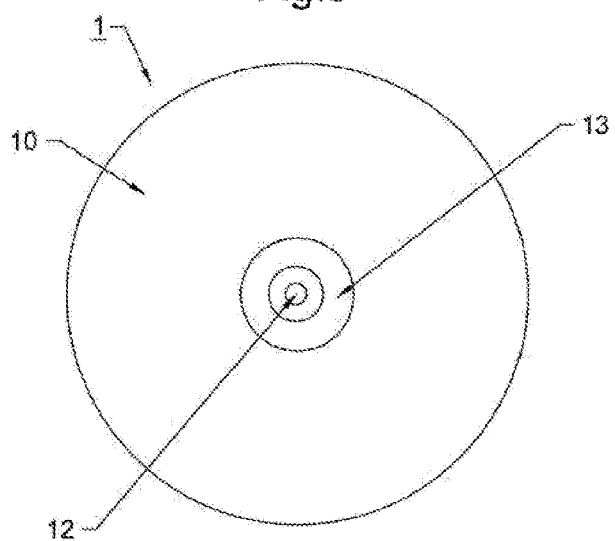
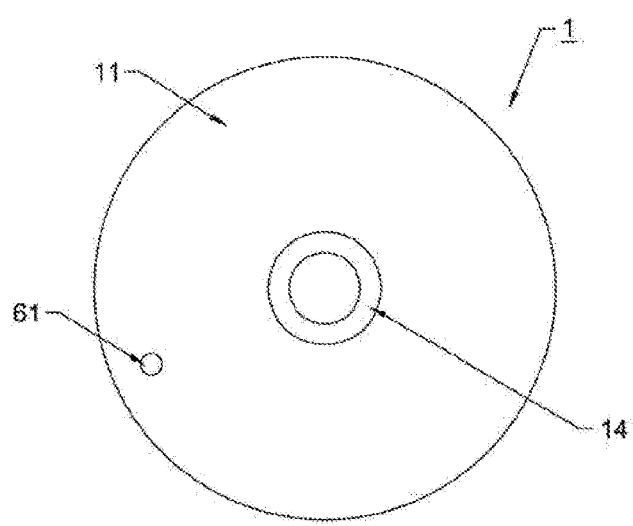

MOULD FOR INJECTING THERMOPLASTICS AND METHOD FOR USING SAID MOULD

CROSS-REFERENCE TO RELATED APPLICATIONS

This application is a national stage entry under 35 USC § 371(b) of PCT International Application No. PCT/ES2016/070646, filed on Sep. 15, 2016, and claims the benefit of Spanish Patent No. P201531310, filed on Sep. 15, 2015, and Spanish Patent No. P201631192, filed on Sep. 14, 2016, which are expressly incorporated by reference herein.

TECHNICAL FIELD

The present specification relates to a mould for manufacturing plastic items obtained by the injection of thermoplastic material and to the method or methodology for obtaining said plastic items by means of said mould and other complementary steps. Specifically, the present invention provides a methodology that reproduces short and medium series of items produced with plastic materials, in particular thermoplastic materials, the mould being made of flexible vulcanised silicone, rubber or other elastomers.

The fields of application of the invention are the following sectors: moulding manufacturing of plastic items, overmoulding of electrical and electronic components, and insertable parts, and injection of plastic materials into elements or items.

BACKGROUND

Various methodologies related to the moulding, overmoulding and injection of plastic materials in order to achieve the final results are known in the industrial sector. All of these methodologies require a mould or matrix as an essential element.

In this regard, it is worth mentioning the patent WO2012127089, which defines a methodology for overmoulding around permanent inserts, using thermoplastics as the injectable melted material, but, as indicated in the description, with a closed, rigid matrix; therefore, not only the mould itself, but also the methodology, are different from those of the present invention. It is also worth mentioning a patent related to the previous one, patent US20100117262, which also defines a methodology for overmoulding over elements using a combination of various plastics, including thermoplastics, and rigid moulds; and patents WO2007034000 and U.S. Pat. No. 4,243,362, which define machinery and methodologies for the injection of metallic-plastic material in order to form moulds and overmoulding, currently defined as co-injection, for which very specific moulds are used that have nothing to do with those of the present invention and, consequently, the methodologies and the machinery are different from those of the present invention. Also worth mentioning are various methodologies that use this type of techniques for specific sectors, such as the automotive, electricity, home automation or computer sectors. For example, we may highlight patent U.S. Pat. No. 4,776,915, which also defines a methodology for preparing small automotive parts by means of moulds, by introducing the material into the mould and subsequently heating it, a methodology that is different from that of the present invention; patent EP2731202, which defines a method for manufacturing insulated connectors for electrical and electronic devices by means of the injection of thermoplastics using rigid moulds; patent WO2012117143, which defines a system and a method for the injection moulding of parts in the field of plastic conduit pipes, performed by means of extrusion machinery that is completely different from the characteristics of the present invention; low-pressure moulding (LPM) methodologies, which are widely used to encapsulate and seal electronic devices, electrical household appliances, wall bushings, etc., and make it possible to customise the external shape by injecting special thermoplastics, also called "hot melts"; and U.S. Pat. No. 6,821,110, which defines an apparatus for moulding items made of plastic material, but, like all the previous methodologies, requires aluminum or steel moulds.

In light of the previous patents, and many other patents and examples related and similar to the aforementioned ones, there is no doubt that moulding, overmoulding and injection are known in the industry, as is the use of thermoplastic materials, but in all cases the mould used is metallic or, at the very least, a rigid material.

However, the present innovation presents a solution based on a flexible mould, which makes it possible to reproduce short and medium series of items produced with thermoplastics, and allows for economical, fast production. It is worth noting that this invention allows for the small-sized production of prototypes, which is inconceivable when rigid or metallic moulds are used, due to their high cost and the long production times. Finally, this new methodology makes it possible to manufacture all types of items, both simple items and complex items with undercuts that cannot be produced using rigid metallic moulds, and is valid for moulding and overmoulding any type of component, such as, for example, electrical and electronic components, and normal items that require overmoulding. For these reasons, the present innovation is considered to be fully differentiated from the techniques known and registered thus far, since it presents a flexible mould that requires an innovative methodology which, in turn, solves the problem of carrying out small- and medium-sized production with feasible times and prices.

In turn, it must be noted that the operational process of the present invention may have limitations, since it must be calibrated and tested whenever the conditions of the thermoplastic material are changed, which changes the type of mould, or whenever the items and their arrangement in the mould are changed. This lack of repeatability of the correct results for the injection process causes material expenditure and excessive down time for calibration using the trial-and-error method, which affects the efficiency of the process and the productivity of the facilities developing it; for this reason, the invention itself is improved.

BRIEF SUMMARY

The present invention is based on a novel mould conception, since it proposes using a flexible mould, as opposed to the rigid moulds used thus far.

The present invention uses a mould made of flexible vulcanised silicone, the mould being an element that may have various configurations, such as circular or non-circular, and radial filling, although it is also added non-radial filling. The mould is formed by two parts, the base or lower mould, and the lid or upper mould. The two parts of the mould are attached or joined by means of a plurality of fasteners or brackets distributed over the contact surfaces thereof, arranged such that they face each other for correct attachment. Preferably, said fasteners are studs that protrude from the side of either the base or the lid, and are embedded into a compartment on the other side designed for such purpose.

The upper mould or lid, and the lower mould or base, are symmetrical elements that share the same elements and, when facing each other and being attached by means of the fasteners, generate a series of compartments and channels through which the melted thermoplastic material flows and allow for the removal of air, to generate a vacuum. They may be asymmetrical in terms of the cavity volumes and the distribution and vacuum conduits.

In turn, the lid and the base are different in that they have two different functions, which cause them to have two differentiating elements. Preferably, the function of the lid or upper mould is to allow for the filling or the injection, whereas the function of the base or lower mould is to allow for the evacuation of air and for a vacuum to be generated in the mould; however, the filling and the vacuum may take place in the same part.

The inlet of the injected material, which, as we shall see below, is thermoplastic material, takes place through the inlet opening located on the lid or upper mould. Preferably, said inlet opening is a vertical radial channel at the centre of the circular mould, which allows for the introduction of the melted thermoplastic material into the mould. The external side of said lid or upper mould has a reinforcement flange that provides the ensemble with greater stability when the material is injected.

On the other hand, the air removed due to the introduction of the injected material exits through a vacuum outlet, which is also an opening located on the base or lower mould. In turn, the external side of said base or lower mould also has a reinforcement area that improves the stresses produced during the injection of the material and the removal of air that generates the vacuum.

As discussed above, the lid and the base are symmetrical elements which, when facing each other and attached by means of the fasteners, generate a series of compartments and channels. Specifically, a distribution chamber is generated in the material inlet area; this is a compartment that receives the injected material and has a plurality of outlets or branches in the form of channels that are connected to the compartments or cavities with the shape of the item that is to be manufactured. This series of branches are the distribution channels, which have a circular or spherical cross-section. These distribution channels run into the evacuated cavities of the body of the mould, which have the same shape as the item that is to be manufactured. The area of attachment between the distribution channel and the cavity of the item is formed by a series of feeders or supply conduits the function whereof is to distribute the melted material inside the cavity in order to improve the filling of said cavity.

Each distribution channel may have a series of branches and there may be several cavities supplied by several variants of the main distribution channel.

Once the thermoplastic material fills the distribution chamber and travels through the channels and the cavities, the air pressure increases and outlets are necessary to allow for correct filling, without bubbles being generated or the increase in pressure causing cracks in the mould. For this reason, tiny conduits or slots emerge from the cavities which are connected to the vacuum channel. At a certain point of said vacuum channel there is a vacuum outlet, which is an opening or hole that allows for the final removal of air from the mould and, therefore, ensures the vacuum. Said tiny slots or conduits have a minuscule cross-section at the area of attachment to the cavity, such that the melted material cannot go through it; only air is allowed to pass. Said cross-section increases along the slot in order to improve the pressures produced by the air. The vacuum channel is a channel that travels along the perimeter of the mould and collects all the air from each of the slots in each of the cavities of the mould.

Finally, it must be specified that the length of the distribution channels is preferably proportional to the size of the cavity of the item, or the number of cavities in each channel. Since the filling is preferably radial, it is desirable that the total filling volume for each of the items, including the distribution channel and the cavity, be identical; therefore, a large-sized cavity has a shorter distribution channel as compared to a smaller-size cavity, although, as discussed above, the process is not carried out exclusively in this manner. Similarly, the radius of the mould is variable, depending on the size requirements for the item to be moulded.

In the present invention, it is incorporated and added that the moulds are preferably rounded or with circular geometries, but they may have various shapes, depending on the production requirements. Although the injection is preferably performed from above the mould and perpendicular to it, it may also performed from the side or from below, according to possible configurations of the openings on the flexible mould. The shape of the cross-section of the channels in charge of carrying the thermoplastic material to the cavities where the items will be formed may vary, depending on the particularities of the design; it is habitually circular, although other shapes are possible, such as, for example, trapezoidal, elliptical and rectangular.

The material of the mould is flexible vulcanised silicone or rubber. Silicone is produced by means of heat and pressure, and is based on sulfur-vulcanised rubber. Preferably, HTV silicone is used. The general use of hot- or high-temperature-vulcanisation elastomers, which include said silicones and rubbers. The Shore A hardness is of the order of 30 to 90, and preferably equal to or greater than 60; moreover, the larger the item to be manufactured, the lower the hardness.

Once the mould is defined, it is desirable to specify the injected melted material. The injected material is thermoplastic, preferably of the hot-melt or polyamide type, a material originating from dimerised fatty acids, the raw material usually being found in the form of pellets, although it may also be found in the form of powder, granules, cartridges or others. This material has a Shore D hardness ranging between 53 and 65, a density lower than 30000 cps, a melting temperature ranging between 180° C. and 250° C., although preferably ranging between 205° C. and 235° C., and a fluidity ranging between 800 and 15000 cps. Moreover, it may have additives that improve its characteristics, such as calcium carbonate loads or glass microspheres for greater hardness once it has been cooled, such as plasticisers that help to correct moisture absorption problems in these polyamides. At this point, it is worth mentioning that, if a item with a certain rigidity is desired, the material of choice should be a polyamide hot melt, whereas, if a somewhat more flexible or elastic material is desired, thermoplastic elastomers may be used.

Finally, it is specified the manufacturing process for the item using the mould described above, which is performed by means of a number of steps explained below:

a) Introducing the thermoplastic material into process supply means, for example, material in the form of pellets into a reservoir equipped with certain resistances or heating devices on the lower area thereof;

b) Heating the thermoplastic material to a temperature ranging between 180° C. and 250° C.;

c) Placing and attaching the vulcanised silicone mould between two platforms that close said mould by a pressure closure, wherein habitually there will be an upper platform that is fixed, equipped with an opening designed to connect the mould to the reservoir, and a support platform that moves as a result of the action of a pneumatic piston that exerts a closing pressure ranging between 1 and 10 bars;

d) Injecting the thermoplastic material at said temperature into the mould through an injection nozzle that introduces the melted material from the reservoir into the internal thermoplastic reception chamber, the injection being generated by an injection pump that is regulated by a variator and a timer, with an actuator that, in turn, controls the injection nozzle; the injection temperature ranging between 180° C. and 250° C. (although the injection nozzle may be at a higher temperature), the injection pressure ranging between 5 and 100 bars, the injection flow rate ranging between 2 and 10 grams/second, and the injection time ranging between 8 and 40 seconds;

e) Removing the inside air from the mould by means of a vacuum conduit connected to an external vacuum pump with a minimum capacity of 16 m3/h, whilst the mould is being filled;

f) Once the mould is filled, opening and relieving the pneumatic piston, allowing the mould to cool down to room temperature if necessary;

g) Separating the two parts of the mould and removing the items generated in the cavities.

At this point, it must be specified that the support platform for the base has a recess designed for the coupling of the reinforced area of the lower part or base of the mould; moreover, it also has a hole that allows for the introduction of a conduit that connects the vacuum pump to the vacuum outlet of the mould. In this regard, the dimensions of this support platform should be greater than the diameter of the mould.

In this process, the injection pressure may be regulated from 0 bar upwards, by controlling the injection rates, which may be as high as 50 grams/second, with unlimited injection times, although it preferably ranges between 1 and 10 bars, as indicated above. It must also be borne in mind that the removal of air by vacuum mechanisms is performed before and during the injection.

It is also worth noting that, if the mould is required to cool down faster, a cooling line may be introduced into the process, bringing the mould into contact with water, or other auxiliary refrigeration means, such as, for example, forced ventilation, may be used.

Finally, the separation of the two parts of the mould may be performed manually or mechanically; all that is needed is to exert a force that is capable of separating the fasteners or brackets that attach the two parts of the mould.

In accordance of the present invention, the method incorporates or is equipped with a control system that controls at least the injection pressure of the thermoplastic inside the flexible mould, and stops the injection into said mould when the stipulated pressures, the closing pressure of the mould closing means and/or the pressure of the resistance of said flexible mould, are exceeded. This control system includes control of the devices for heating the thermoplastic material, the performance of the vacuum system, the velocity or flow rate of the material, and the temperature of the mould, as well as the mould closing means and the minimum solidification times until said closing means are opened, thereby allowing for manual or automatic regulation of the injection pressure, the inlet rate of the material, the temperature to which the thermoplastic material is heated and the temperature of the mould, the performance of the vacuum system and the closing pressure of the flexible mould, as well as the time during which it will remain closed during the solidification. Moreover, the method incorporates an automated carousel system that takes the selected moulds to the injection position in the selected order, and we add the improvement whereby a mould identification phase is incorporated in order for the control system to know the characteristics of the mould.

BRIEF DESCRIPTION OF DRAWINGS

In order to supplement the description and to contribute to a better understanding of the characteristics of the invention, a set of drawings is attached to said description as an integral part thereof, where the following is represented for illustrative, non-limiting purposes:

FIG. 3 is a representation of the external side of the lid or upper part of a mould.

FIG. 4 is a representation of the external side of the base or lower part of a mould.

DETAILED DESCRIPTION

Figure 1:
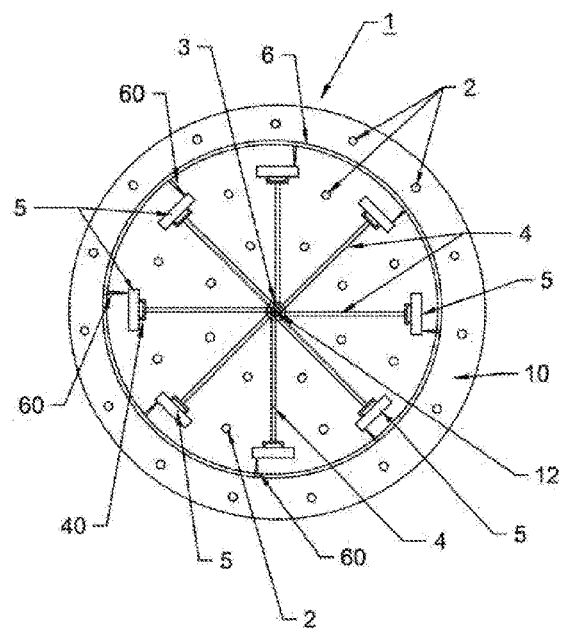
FIG. 1 is a representation of the internal side of the lid or upper part of a mould.
Figure 2:
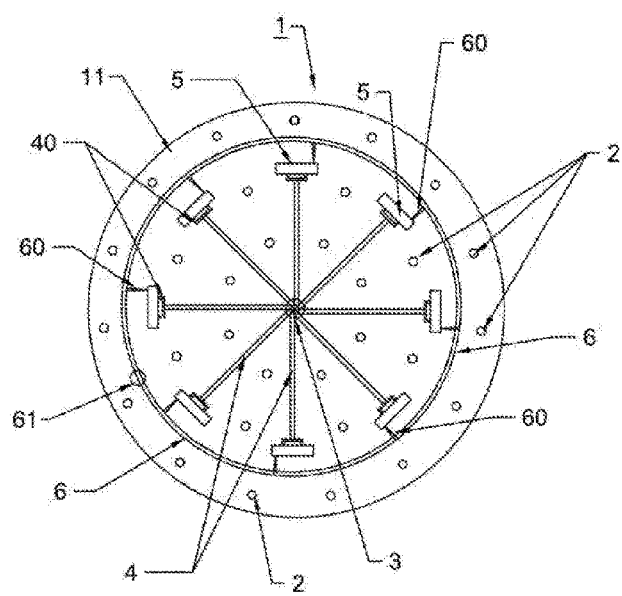
FIG. 2 is a representation of the internal side of the base or lower part of a mould that is complementary to that of FIG. 1.

As may be observed in FIGS. 1 and 2, the mould 1 of this invention is formed by two parts, the upper mould 10 or lid, and the lower mould 11 or base, which share the same elements and, when facing each other and attached by the fasteners 2 or brackets, generate a series of compartments and channels, and, therefore, may be either symmetrical or asymmetrical. It may be observed that at the melted material inlet area, which is an inlet opening 12 on the upper mould 10, a distribution chamber 3 is generated, which is a compartment that receives the injected material and opens to a plurality of distribution channels 4, which are outlets or branches in the form of channels that connect the chamber 3 to the compartments or cavities 5 and have the same shape as the item that is to be manufactured. The area of attachment between the distribution channel 4 and the cavity 5 of the item is formed by a series of feeders 40 or supply conduits the function whereof is to distribute the melted material inside the cavity 5 in order to improve the filling of said cavity. Tiny conduits or slots 60 that are connected to the vacuum channel 6 emerge from the cavities 5. At some point of said vacuum channel there is a vacuum outlet 61, which is an opening or hole that allows for the final removal of air from the mould 1 and, therefore, ensures the vacuum.

In turn, as may be observed in FIGS. 3 and 4, the lid 10 and the base 11 are different in that they have two different functions, which cause them to have two differentiating elements. At the centre of the surface of the lid 10 or upper mould there is an opening 12 through which the melted material enters, which is a through-hole that is connected to the interior of the mould, and on the external side there is a reinforcement flange 13 that provides the ensemble with greater stability when the material is injected; whereas the base 11 or lower mould has an outlet opening that corresponds to the vacuum outlet 61 point, and which is also a through-hole that allows for the outlet of air; the external side having a central reinforcement area 14 that improves the stresses produced when the material is injected and the removal of air when the vacuum is generated.

Figure 5:
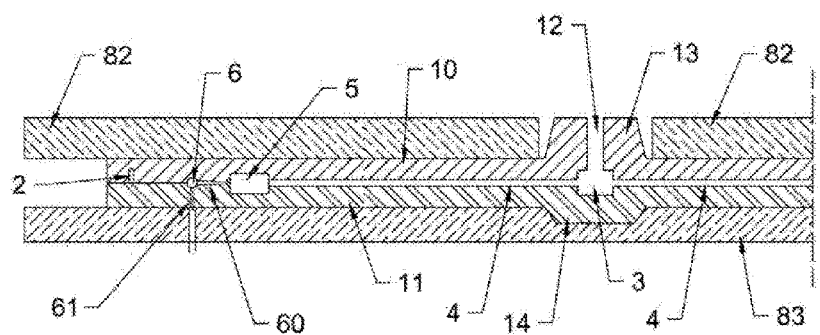
FIG. 5 is a representation of a cross-section of the attachment area between the two parts of the mould without any injection of material.
Figure 6:
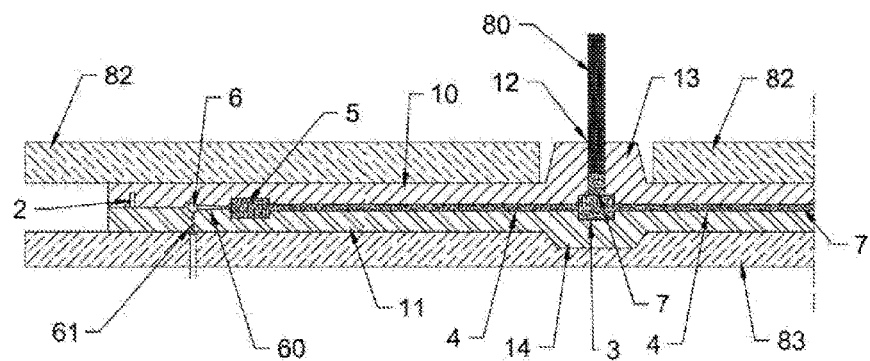
FIG. 6 is a representation of the cross-section of FIG. 5 with injection of material.

FIGS. 5 and 6 represent the attachment of both parts of the mould 1, FIG. 5 showing it without the melted material being injected, and FIG. 6 representing the mould 1 with the melted material 7 injected. In these figures, it may be observed that the inlet opening 12 is a vertical radial conduit pass through located at the centre of the circular mould 1, which allows for the introduction of the melted thermoplastic material 7 into the chamber 3 for the subsequent radial distribution thereof. It may also be observed that the air removed due to the introduction of the injected material exits through a vacuum outlet 61, which is also an opening located on the base 11 or lower mould. FIG. 6 primarily shows an injection nozzle 80 injecting the melted thermoplastic material 7 and that, once the thermoplastic material 7 fills the distribution chamber 3 and travels through the distribution channels 4 to reach the cavities 5, the air pressure increases and outlets are necessary to allow for correct filling without bubbles being generated or the increase in pressure causing cracks in the mould, these outlets being the slots 60 that are connected to the vacuum channel 6, and the slots 60 having a variable cross-section. It may also be observed that both parts of the mould are secured and attached by means of the fasteners or brackets 2, and, in turn, are embedded into fastening platforms 82 and 83.

Figure 7:
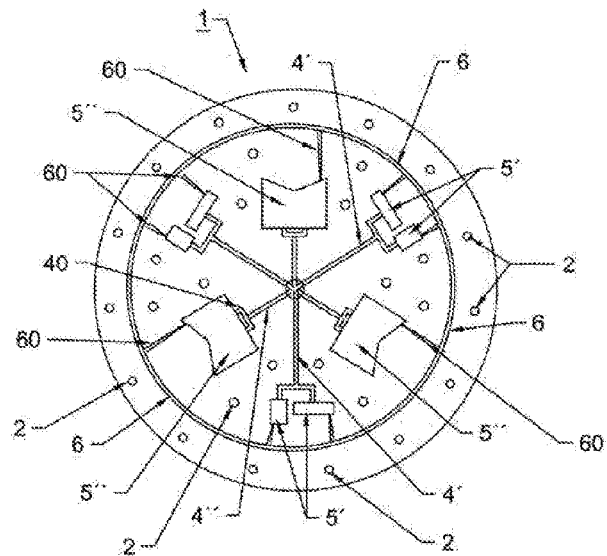
FIG. 7 is a representation of the internal side of a lid or upper part of a mould with a configuration different from that of FIG. 1.

FIG. 7 represents a different configuration of the mould 1, wherein it may be observed that it has the same characteristics as the previous one, except that it has distribution channels 4' that may have two branches that supply two cavities 5, and that there are shorter distribution channels 4" that supply larger-sized cavities 5".

Figure 8:
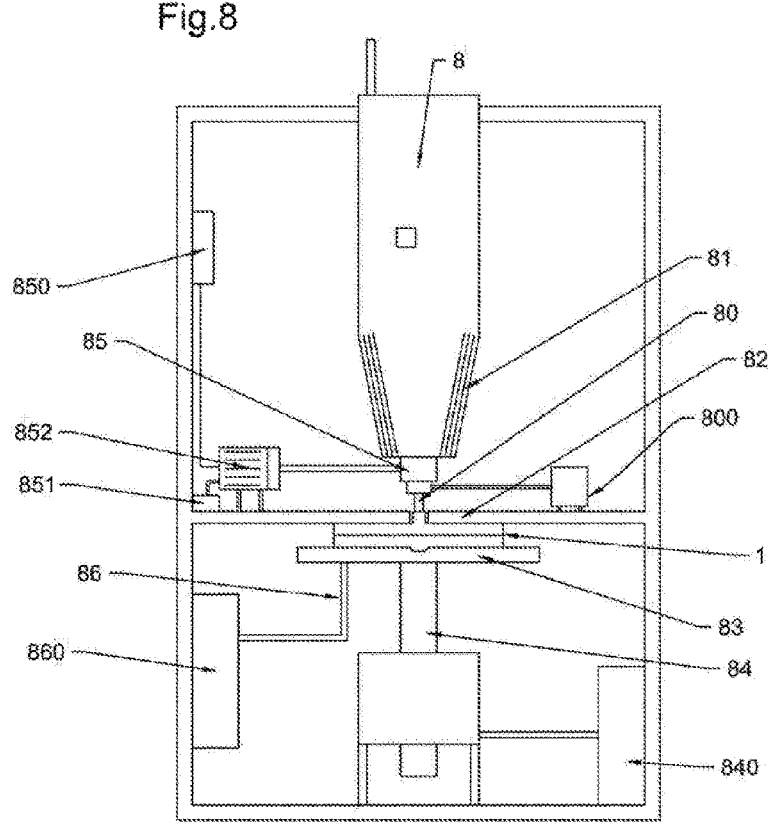
FIG. 8 is a representation of the manufacturing process for a part generated by a prototype mould.

FIG. 8 shows a diagram of the manufacturing process for a part using the mould 1 described:

a) Introducing the thermoplastic material 7, for example in the form of pellets, into a reservoir 8 equipped with certain resistances 81 or heating devices on the lower area thereof;

b) Heating the thermoplastic material 7 to a temperature ranging between 180° C. and 250° C.;

c) Placing and attaching the vulcanised silicone mould 1 between two platforms: one upper platform, which is fixed 82 and is equipped with an opening designed to connect the mould 1 to the reservoir 8, and a support platform 83 that moves as a result of the action of a pneumatic piston 84 that exerts a closing pressure;

d) Injecting the thermoplastic material 7 into the mould 1 through an injection nozzle 80 that introduces the melted material 7 from the reservoir into the internal reception chamber 3 of the mould 1, the injection being generated by an injection pump 85 actuated by a motor 852 and regulated by a variator 850 and a timer 851, with an actuator 800 that, in turn, controls the injection nozzle 80;

e) Whilst the mould 1 is being filled with the melted material 7, removing the inside air from the mould 1 by means of a vacuum conduit 86 that connects the vacuum outlet point 61 of the mould 1 to an external vacuum pump 860;

f) Once the mould 1 has been filled, opening and relieving the pneumatic piston 84 actuated by a compressor 840, and allowing the free mould 1 to cool down to room temperature;

g) Separating the two parts of the mould 1, the upper mould 10 or lid, and the lower mould 11 or base, and removing the items generated in the cavities 5.

Figure 9:
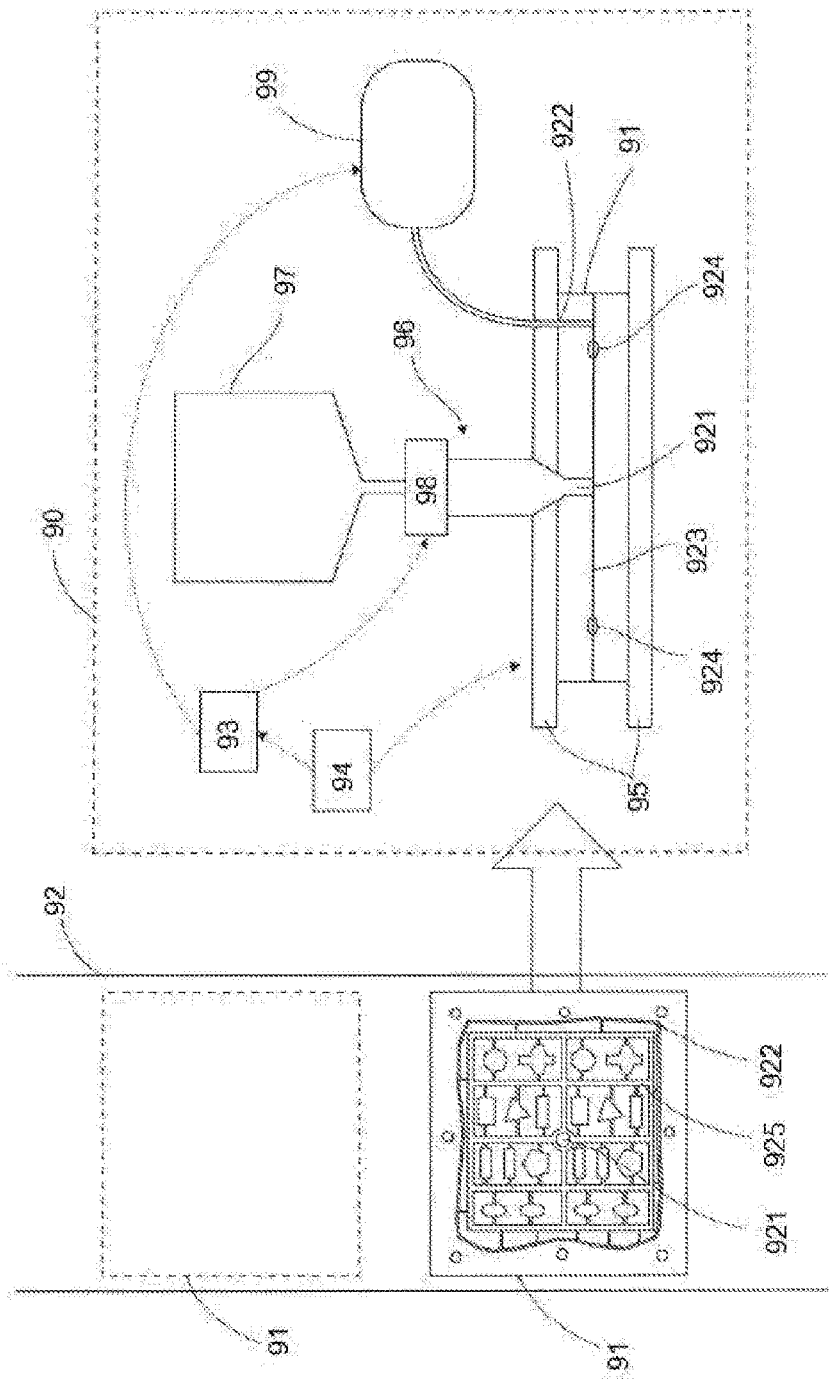
FIG. 9 is a representation of the addition of a solution wherein the thermoplastic injection process incorporates or adds a control system and an improved mould.

Finally, FIG. 9 represents the addition of another embodiment to the process of the present invention, wherein, starting from what was described and referenced above, a control system 93 and a number of additional elements are added to the process. As may also be observed, the mould 91 is a mould that may have a configuration other than circular; in the present figure it is represented as having a quadrangular shape.

In this regard, as may be observed in said FIG. 9, there is a carousel moulding system 92 that is loaded with different flexible moulds 91, such that the process may be continuously supplied with moulds 91. Whenever a mould 91 is incorporated into the injection process 90, it is identified through code recognition means 94 in order for the process control system 93 to know the characteristics of the mould, its flexibility and the part that is to be made; for example, the geometry of the part, the volume or others. Once the mould 91 to be loaded is determined, said flexible mould 91 is introduced into the closing means 95, which are habitually formed by two platforms with relative movement between them such that they may close together by a pressure closure, at the pressure determined by the control system 93. This pressure may be obtained by means of habitually used pressure systems or movement of the platforms. One of the platforms is equipped with the opening designed for the insulated coupling to the injection system, as well as the opening designed for the insulated coupling to the vacuum system, corresponding to the arrangement of the openings on the parts of the flexible mould 91. In other embodiments, this distribution of the openings may be carried out on platforms and different parts of the closing system and the flexible mould. In the present embodiment, the thermoplastic material injection system 96, which is supplied with said material by means that consist of a reservoir 97 with resistances that keep the thermoplastic material under suitable injection conditions, will use a pump with a variator and a timer, in addition to a pressure control system 98 formed by recirculation of the thermoplastic material, which operates actively, driven and regulated by the control system, when the mould is filled and the pressure of the thermoplastic material begins to rise. Other systems are possible in alternative embodiments, such as controlling the pressure exerted by an injection piston (acceleration and stroke of its piston) or using pressure sensors, or pressostats, which, once they know the pressure of the thermoplastic material, may act by stopping the pump motor, amongst other possibilities. The vacuum system 99, actuated by the control system 93, will remove the inside air from the mould 91 prior to and during the injection, creating a pressure of up to 5 mbar absolute. Once the control system 93 confirms that the pressure of the injected thermoplastic material is higher than that set as a limit, the injection of material into the mould stops, and the mould is cooled down and opened, for the subsequent unmoulding of the items. Since it is supplied by an automated carousel system 92, the process 90 will introduce the new mould 91 into the closing system 95 once said mould 91 has been identified by the recognition system 94, in order for the control system 93 to be able to determine the closing pressure of the mould 91, the injection and final pressure values, and the beginning and the end of the vacuum system 99 operation, and verify that the conditions of the thermoplastic material that is placed on the means that supply 97 the injection system 96 are suitable. The flexible mould 91 is still made of vulcanised silicone, and Shore A hardnesses ranging between 30 and 90 are obtained; in the present embodiment, it has a square shape and is equipped with a filling opening 921 on one part and an opening 922 designed for coupling to the vacuum system 99 on the same part. This mould 91 will have a graphic code, such that it may be identified by the control system 93, although in alternative embodiments this may be performed by means of RFID tags or other identification systems. The mould 91 is equipped with a non-radial arrangement of thermoplastic material filling channels 923 connected to the cavities 924 that form the items. There are also vacuum channels 925 with a minimum cross-section that practically does not allow for any material to pass, but only allows for passage of the air removed by the vacuum system 99, which are connected to a channel that connects them to one another and, in turn, is connected to the vacuum system 99.

Having sufficiently described the nature of the present invention, having taken into consideration that the terms of this specification must be understood in a broad, non-limiting sense, having described the way to implement it, and having demonstrated that it is a positive technical development, we apply for registration of the patent, the essence of the aforementioned invention being specified in the following claims.

What is claimed is:

1. A mould for injecting thermoplastics, subjected to a pressure injection, wherein the mould is formed by an upper mould or lid, and a lower mould or base, wherein the mould is made of flexible vulcanised silicone, rubber or other elastomers with a Shore A hardness between 30 and 90, and wherein, when the upper mould and the lower mould are facing each other and attached by fasteners or brackets, a distribution chamber for melted thermoplastic material is generated which is supplied by a central, a reinforced pass through opening on the upper mould with a sealed coupling to sealingly couple to an injection system, and a plurality of distribution channels exit from the distribution chamber, which are connected to cavities by feeders with the shape of the item that is to be manufactured, and wherein tiny slots emerge from each cavity, which are connected to a perimetral vacuum channel having a vacuum outlet pass through opening on the lower mould, with a sealed coupling to sealingly couple to a vacuum system, wherein air is removed via the tiny slots that have a miniscule cross-section such that melted thermoplastic material cannot pass through the tiny slots but the air can pass through the tiny slots to the vacuum channel.

2. The mould according to claim 1, wherein the upper mould or lid has a reinforcement flange on the central part of the external side designed for the sealed coupling to an injection system.

3. The mould according to claim 1, wherein the lower mould or base has a central reinforcement area on the external side designed for the sealed coupling to an injection system.

4. The mould according to claim 1, wherein the slots have a variable cross-section, wherein the variable cross-section increases along the slot between the cavity and the vacuum channel.

5. The mould according to claim 1, wherein the mould incorporates a code or other elements in order for said mould to be able to be identified by a control system.

6. The mould according to claim 1, wherein the reinforced pass through opening and the vacuum outlet pass through opening are on the same part of the two parts that make up the mould.

7. The mould according to claim 1, wherein the two parts of the mould are asymmetrical.

8. A method for using a mould for injecting thermoplastics in a pressure injection process for the manufacturing of plastic items, the method comprising:
   introducing a thermoplastic material into a process supply unit;
   heating the thermoplastic material to a melt temperature of the thermoplastic material;
   placing and attaching a flexible mould between two platforms of a pressure injection system, via a sealed coupling, wherein the two platforms close said mould by a pressure closure, wherein this pressure closure is variable and determined by a control system;
   injecting the thermoplastic material into the mould through an injection nozzle that introduces the thermoplastic material as a melted material from a reservoir into an internal reception chamber of the mould;
   whilst the mould is being filled with the melted material, and also prior thereto, removing inside air from the mould by a vacuum system, which comprises a vacuum conduit that connects, via a sealed coupling, a vacuum outlet point of the mould to an external vacuum pump of the vacuum system, wherein the air is removed via tiny slots that have a miniscule cross-section such that the melted thermoplastic material cannot pass through the tiny slots but the air can pass through the tiny slots to the vacuum conduit;
   once the mould has been filled, opening and relieving pressure that closes the mould, allowing the free mould to cool down;
   separating the mould by separating an upper mould or lid, from a lower mould or base, and removing parts generated in cavities;
wherein the method further comprises:
   controlling, by the control system:
      the injection pressure of the thermoplastic material into the flexible mould;
      stopping injection into the mould when the stipulated pressures, the closing pressure of the mould closing system, and/or the pressure of the resistance of said flexible mould, are exceeded;
      controlling a device for heating the thermoplastic material,
      controlling the operation of the vacuum system, before and during the injection process,
      controlling velocity or flow of the material and the temperature of the mould,
      controlling the mould closing system and the minimum solidification times until said closing system are opened,
      performing a manual or automatic regulation of:
         the injection pressure,
         the material inlet rate,
         the temperature to which the thermoplastic material is heated, and the temperature at which the mould is heated,
the operation of the vacuum system,
the closing pressure of the flexible mould, and
the time during which the flexible mould will remain closed for the solidification of the thermoplastic material.

9. The method for injecting thermoplastics, according to claim 8, wherein injecting the thermoplastic material comprises injecting the thermoplastic material such that a temperature of the injected thermoplastic material ranges between 180° C. and 250° C.

10. The method for injecting thermoplastics, according to claim 8, wherein allowing the free mould to cool down comprises allowing the free mould to cool down to room temperature.

11. The method for injecting thermoplastics, according to claim 8 further comprising incorporating a mould identification phase in order for the control system to be able to determine the characteristics of the mould.

12. The method for injecting thermoplastics, according to claim 8 further comprising implementing an automatic introduction of selected moulds by an automated carousel system that takes the selected moulds to an injection position in a selected order.

* * * * *